(12) United States Patent
Gaier et al.

(10) Patent No.: US 11,086,755 B2
(45) Date of Patent: Aug. 10, 2021

(54) SYSTEM AND METHOD FOR IMPLEMENTING AN APPLICATION MONITORING TOOL

(71) Applicant: JPMorgan Chase Bank, N.A., New York, NY (US)

(72) Inventors: Daniel J. Gaier, Powell, OH (US); Brian R. Pennell, Galena, OH (US); David Richard Kalkstein Deloveh, Columbus, OH (US); Tristan Chiappisi, Gahanna, OH (US); Paul Knuth, Westerville, OH (US); Michael Frank, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/018,701

(22) Filed: Jun. 26, 2018

(65) Prior Publication Data
US 2018/0373617 A1     Dec. 27, 2018

Related U.S. Application Data

(60) Provisional application No. 62/524,661, filed on Jun. 26, 2017.

(51) Int. Cl.
*G06F 9/44*     (2018.01)
*G06F 11/36*    (2006.01)
(Continued)

(52) U.S. Cl.
CPC ........ *G06F 11/3612* (2013.01); *G06F 11/302* (2013.01); *G06F 11/3055* (2013.01);
(Continued)

(58) Field of Classification Search
CPC ............... G06F 11/3612; G06F 11/302; G06F 11/3055; G06F 11/3082; G06F 11/3419;
(Continued)

(56) References Cited

U.S. PATENT DOCUMENTS 5,432,932 A * 7/1995 Chen .................... G06F 11/0715
                                        702/179
6,078,956 A * 6/2000 Bryant .................... H04L 29/06
                                        709/224
(Continued)

OTHER PUBLICATIONS

Title: End-user Tools for Application Performance Analysis Using Hardware Counters.; author: KS London et al, published on 2001.*
(Continued)

*Primary Examiner* — Chameli Das
(74) *Attorney, Agent, or Firm* — Hunton Andrews Kurth LLP (57) ABSTRACT

The invention relates to an application monitoring tool. According to an embodiment of the present invention, the application monitoring tool has an integrated event/tracing API that traces distributed and non-distributed system flows. For example, a tracing approach may be integrated with a Metrics functionality in that tracing may be throttled or turned on/off based on defined intervals, threshold breaches, and/or anomaly detection of related metrics. If an application's web service calls are beginning to take longer than "normal," an event/tracing collection feature may be activated to trace calls to enable deeper analysis of the problem.

14 Claims, 7 Drawing Sheets

(51) Int. Cl.
  *G06F 11/34* (2006.01)
  *G06F 11/30* (2006.01)
(52) U.S. Cl.
  CPC ...... *G06F 11/3082* (2013.01); *G06F 11/3419* (2013.01); *G06F 11/3452* (2013.01); *G06F 11/3616* (2013.01); *G06F 11/3664* (2013.01); *G06F 2201/835* (2013.01); *G06F 2201/865* (2013.01); *G06F 2201/88* (2013.01)
(58) Field of Classification Search
  CPC ............ G06F 11/3452; G06F 11/3616; G06F 11/3664; G06F 11/361; G06F 2201/805; G06F 2201/88; G06F 2201/835; G06F 2201/86; G06F 2201/865
  USPC ........................................................ 717/131
  See application file for complete search history.

(56) References Cited

U.S. PATENT DOCUMENTS

| | | | | |
|---|---|---|---|---|
| 6,108,700 | A * | 8/2000 | Maccabee | H04L 41/0631 709/224 |
| 8,090,995 | B2 * | 1/2012 | Klein | H04L 41/5035 714/46 |
| 8,549,459 | B1 | 10/2013 | Wadland | G06F 17/5077 716/100 |
| 9,277,432 | B2 * | 3/2016 | Mathur | G06F 21/6227 |
| 10,339,455 | B1 * | 7/2019 | Parush-Tzur | G06N 5/04 |
| 2003/0028858 | A1 * | 2/2003 | Hines | G06F 8/36 717/125 |
| 2003/0056200 | A1 * | 3/2003 | Li | G06F 11/323 717/128 |
| 2004/0142087 | A1 * | 7/2004 | Lerchenfeld | A23L 2/02 426/599 |
| 2005/0155022 | A1 * | 7/2005 | DeWitt, Jr. | G06F 11/3612 717/131 |
| 2006/0236309 | A1 * | 10/2006 | George | G06F 11/3466 717/133 |
| 2007/0083813 | A1 * | 4/2007 | Lui | G06F 11/3612 715/709 |
| 2007/0266434 | A1 * | 11/2007 | Reifer | G06F 21/14 726/22 |
| 2007/0294681 | A1 * | 12/2007 | Tuck | G06F 11/3404 717/149 |
| 2011/0098973 | A1 * | 4/2011 | Seidman | G06F 11/3409 702/179 |
| 2012/0066378 | A1 * | 3/2012 | Lui | G06F 11/3612 709/224 |
| 2012/0095728 | A1 * | 4/2012 | Ubukata | G06F 11/3466 702/186 |
| 2014/0096249 | A1 * | 4/2014 | Dupont | G06F 21/00 726/23 |
| 2014/0324862 | A1 * | 10/2014 | Bingham | G06F 16/26 707/737 |
| 2015/0032884 | A1 * | 1/2015 | Greifeneder | H04L 43/04 709/224 |
| 2015/0254172 | A1 * | 9/2015 | Baril | G06F 11/3616 717/128 |
| 2015/0347277 | A1 * | 12/2015 | Gataullin | G06F 11/3676 717/128 |
| 2016/0085999 | A1 * | 3/2016 | Oppenheimer | G06Q 10/08 726/35 |
| 2016/0378994 | A1 * | 12/2016 | Hibbert | H04L 63/20 726/1 |
| 2017/0262786 | A1 * | 9/2017 | Khasis | G08G 1/202 |
| 2017/0330445 | A1 * | 11/2017 | Stearns | H04N 5/77 |
| 2018/0041409 | A1 * | 2/2018 | Vasseur | H04L 43/0852 |
| 2020/0167349 | A1 * | 5/2020 | Marquardt | G06T 11/206 |

OTHER PUBLICATIONS

Title: A performance validation tool for J2EE applications, author: J Guo et al, published on 2006.*
Superpin Parallelizing dynamic instrumentation for real-time performance author: S Wallace, et al published on 2007.*
Real-time visualization of network behaviors for situational awareness,author: DM Best et al, published on 2010, source: ACM.*
Review of performance metrics for green data centers: a taxonomy study, author: L Wang et al, published on 2013.*

* cited by examiner

SYSTEM AND METHOD FOR IMPLEMENTING AN APPLICATION MONITORING TOOL

CROSS REFERENCE TO RELATED APPLICATIONS

This application claims priority to U.S. Provisional Application 62/524,661, filed Jun. 26, 2017, the contents of which are incorporated herein in its entirety.

FIELD OF THE INVENTION

The invention relates generally to a system and method for implementing an application monitoring tool that monitors the health and performance of an application and more specifically, to an internal approach and implementation of how the metrics are collected, batched, and sent to a backend aggregation system.

BACKGROUND OF THE INVENTION

Application development teams generally rely on Application Performance Management (APM) tools to aid in performance monitoring and investigation of applications. APM products provide deep and complex tools to dig into an application's inner workings and operational characteristics. However, the most common performance monitoring needs do not actually require the deep capabilities the APM tools provide. Often, performance and/or operation teams use about 10% of the APM capabilities to cover 90% of their work.

With hundreds of applications requiring performance monitoring, the effort to leverage and manage these tools effectively is unwieldy. This is partly due to the emphasis of using APM's as "after the fact" tools for uncovering performance problems with apps.

These and other drawbacks exist.

SUMMARY OF THE INVENTION

According to one embodiment, the invention relates to a system that implements an application monitoring tool. The system comprises: a Metrics Library that is configured to collect, batch and send metric and event records to an application programming interface (API); an interactive user interface that provides a display and receives user input; and a back-end aggregation engine, coupled to the Metrics Library, the API and the interactive user interface, the back-end aggregation engine comprising a processor configured to perform the steps of: enable, via an electronic input, a developer to identify one or more metrics and events associated with an execution of an application; retrieve, via the API, corresponding metric records and event records associated with the execution of the application at a back-end server; calculate real-time statistics based on the metric records and event records for the application; transmit, via a communication network, the real-time statistics to an Operational Data Store for data warehousing and reporting; generate an interactive display of the real-time statistics for real-time dashboarding; and display, via the interactive user interface, the interactive display that further comprises historical data over a predetermined period of time.

According to another embodiment, a method for implementing an Application Monitoring Tool comprises the steps of: enabling, via an electronic input, a developer to identify one or more metrics and events associated with an execution of an application; retrieving, via an application programming interface (API), corresponding metric records and event records associated with the execution of the application at a back-end server; calculating, via a back-end aggregation engine, real-time statistics based on the metric records and event records for the application; transmitting, via a communication network, the real-time statistics to an Operational Data Store for data warehousing and reporting; generating an interactive display of the real-time statistics for real-time dashboarding; and displaying, via the interactive user interface, the interactive display that further comprises historical data over a predetermined period of time.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The innovative system and method provides comparative analysis and insights into operational characteristics of an application. The innovations also allows for dynamic capabilities to be controlled centrally and more efficiently. With the industry moving towards agile software development and delivery with increased developer and operations collaboration (e.g., DevOps), a more modern and efficient approach to achieve basic performance monitoring is needed. This approach includes incorporating metrics as a feature of the application. In other words, development teams would consider metrics as a deliverable as part of the software development life cycle (SDLC). These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Developers are considered experts of an application's internal operations and characteristics. These developers instrument key areas of the application to emit metrics about how those internal functions are performing. This may include a current internal state of the application, how often an event is happening (e.g., count and rate), how long an event is taking (e.g., durations), count of errors and count of success as compared to failures for a given operation. Using these tools and libraries, an application may be instrumented by a software developer to emit metric data about itself.

An embodiment of the present invention is directed to an Application Monitoring Tool that monitors the health and performance of an application. The innovative tool is different from currently available products in multiple areas. An embodiment of the present invention is directed to an internal approach and implementation of how the metrics are collected, batched, and sent to a backend aggregation system. The backend aggregation system uses data reduction techniques and calculates rollup aggregates to capture key statistics for a predetermined time period, e.g., X minute(s).

The Application Monitoring Tool implements an integrated event/tracing API that traces distributed and non-distributed system flows. According to an embodiment of the present invention, a tracing approach may be integrated with a Metrics functionality in that tracing may be throttled or turned on/off based on defined intervals, threshold breaches, and/or anomaly detection of related metrics. For example, if an application's web service calls are beginning to take longer than "normal" (or reach a predetermined threshold), an event/tracing collection feature may be activated to trace calls to enable deeper analysis of the problem.

The Application Monitoring Tool allows other dynamic capabilities to be controlled centrally. Typically, once a library is released and application development teams take a copy and uses it, control may be lost over the library. According to an embodiment of the present invention, the library may "check-in" for configuration data on an interval. This feature allows the Application Monitoring Tool to centrally control "knobs" and "switches" for each application using the library. This may include a "kill switch" to turn the library completely off, turn portions of the library on/off, and/or control certain aspects of metrics collection to adjust to throughput and/or usage of the application.

An embodiment of the present invention may be directed to dashboards or other interfaces to display the metrics and events data. The dashboards allow users to compare current metrics with a previous time period. This would enable scenarios where a developer may compare how an application is running before as opposed to after a specific change.

An embodiment of the present invention may incorporate pre-release performance testing data from a developer enablement tool that allows developers to performance test their own code and/or applications. For example, X minute rollup data may be stored in a data warehouse, which may provide for ad hoc and/or deeper historical analysis.

An embodiment of the present invention is directed to integrating an alert function, which may be based on X minute rollup statistics. This feature may include a custom dashboard that allows development (or operation) teams to set, control and/or stop alerts based on statistical analysis of incoming metrics data. For example, an embodiment of the present invention may send an alert if a certain web service call is being timed and the system detects the 99.9th percentile duration of that call over the last 10 minutes has passed a predetermined threshold. According to an embodiment of the present invention, the system may provide alerting control options that (1) identify the percentile, 90, 95, 99, 99.9, etc. (2) identify how long or how many consecutive times the calculated percentile has breached a threshold (3) and control based on a time dimension (e.g., time of day, day of week, holiday, etc.). An embodiment of the present invention may perform an automatic "baselining" based on a learning period—that is, automatically compute expected normal operation and further suggest thresholds that may indicate abnormal operation.

An embodiment of the present invention is directed to incorporating metrics as a feature of the application. In other words, development teams may consider metrics as a deliverable as part of the SDLC. With proper instrumentation by the development team, the application itself may emit its own operational metrics. In contrast, existing approaches of using Application Performance Management (APM) tools are limited to interrogating the application after it has been built or deployed.

An embodiment of the present invention may require development teams to increase their cognitive awareness of key performance characteristics of their applications during various phases of the SDLC to ensure proper metrics are captured and leveraged during and/or after the build stage. Also, an embodiment of the present invention recognizes that enhanced collaboration between development and operations teams is vital, including agreement and documentation of the metrics. An embodiment of the present invention is directed to a standardized approach for emitting and collecting such metrics, and other downstream functionality including visualization, reporting and alerting.

Figure 1:
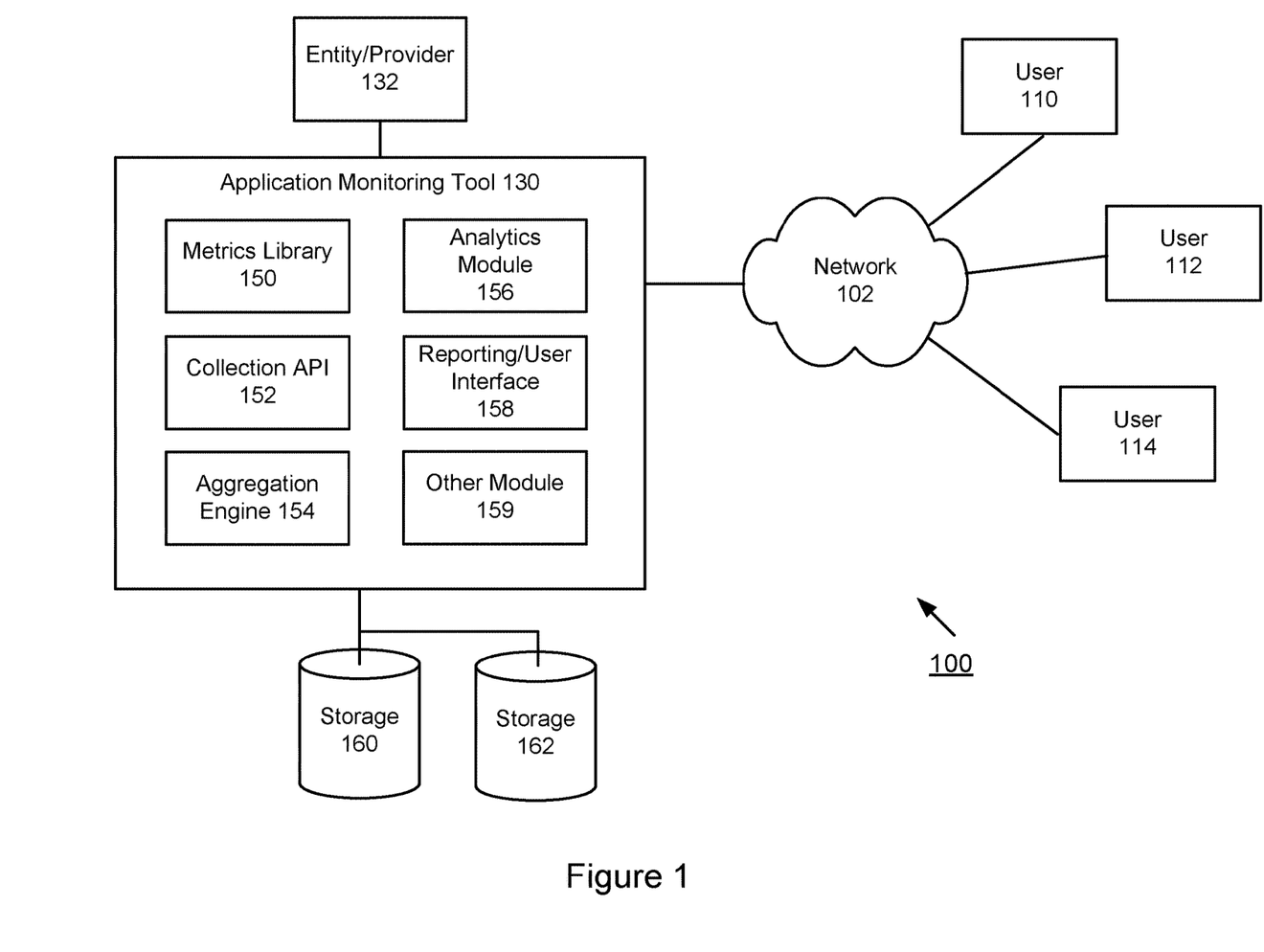
FIG. 1 is an exemplary system diagram that illustrates an Application Monitoring Tool, according to an embodiment of the present invention.

FIG. 1 is a an exemplary system diagram that illustrates an Application Monitoring Tool, according to an embodiment of the present invention. Entity/Provider 132 may implement an Application Monitoring Tool 130. As shown in FIG. 1, Application Monitoring Tool 130 may include a server, processor and/or other computer components and include various models and/or tools, including Metrics Library 150, Collection API 152, Aggregation Engine 154, Analytics Module 156 and Reporting/User Interface 158. Other modules and tools may be represented by Other Module 159. System 110 may store and manage data in various storage components, represented by Storage 160, 162. These modules, tools and components are exemplary and illustrative, the system may include additional modules, a combination of the modules described and/or less modules than illustrated. While a single illustrative block, module or component is shown, these illustrative blocks, modules or components may be multiplied for various applications or different application environments. The modules and/or components may be further duplicated, combined and/or separated across multiple systems at local and/or remote locations. Other architectures may be realized.

Metrics Library 150 may represent a library, such as a .NET/Java library that provides the metrics API and events API. Metrics Library 150 may collect, batch and send metric and/or event log records to a load balanced Collection API, represented by 152. Metrics Library 150 also provides a mechanism to allow the application to log the metrics/event data according to preferences. Metrics Library 150 may obtain dynamic configuration from a centralized configuration store and support Dependency Injection (DI) usage, along with static usage (no DI). For example, Metrics Library 150 may emit metrics about an application that it is instrumented to as a back-end solution. Metrics Library 150 itself may be associated with an application identifier where the library may be controlled through the associated application. An embodiment of the present invention may be directed to building a library that developers may use to instrument their server-side Service Layer/Middle-tier code (.NET or Java code). Storage may offer flexibility and customization as necessary, including calculations, alerting rules, etc.

According to an embodiment of the present invention, Metrics Library 150 may have no dependencies which allows application development teams to easily use the Application Monitoring Tool without conflicts in applications. Metrics Library 150 may also provide operational visibility where the library and a backend system itself may have internal logging and metrics. Metrics Library 150 further supports custom dynamic capabilities, e.g., application-level kill switch, control event sampling rate based on metric thresholds, etc.

Metrics Library provides an API to record a tracing event. An embodiment of the present invention may further implement a Metrics API that may be extended to include an Event API. If a developer uses the Tool to time an operation (e.g., a method call, a web service call, any block of code), the developer may also capture an event. The event may record an Activity ID (e.g., a Correlation ID). According to an embodiment of the present invention, an Event API may be tied to a Metrics API so that users may control when to actually record the event. The Application Monitoring Tool may automatically turn event collection on or off based on statistics calculated using the recorded durations from the metrics. Accordingly, if a particular web call is observed to be slowing down over some period of time, the Application Monitoring Tool may automatically enable the event capture for deeper level tracing.

Collection API 152 may represent a RESTful web service for receiving metric and/or event log data. For example, Collection API 152 may receive data serialized as JSON over HTTP. Collection API 152 may further support compression and send data to a Near Real-Time Aggregation SQL Server (represented by 154). Collection API 152 may further leverage local NLog file logging as a queue to protect against data loss for downstream outages.

Aggregation Engine 154 may represent a near real-time Aggregation Engine, such as a SQL Server based aggregation engine for near real-time data. Aggregation Engine 154 may calculate real-time statistics (e.g., percentiles, counts, sums averages, etc.). For example, Aggregation Engine 154 may forward 5 minute rollup data to an Operational Data Store (ODS) for data warehousing and additional non-real-time reporting. Aggregation Engine 154 may also forward 5 minute rollup data to a centralized Analytics Module 156 for real time dashboarding as well as other output formats.

Storage 160, 162 may represent an ODS that receives rollups for historical data management. For example, a centralized Analytics Module 156 may receive rollups for real time purposes. Storage 160, 162 may support configurable rules surrounding metrics which control Event logging on and off. Event records may be dropped or forwarded to ODS for reporting. This may be similar for monitoring and/or alerting. An embodiment of the present invention may be directed to automatically learn standard baseline and build threshold/alerting rules using artificial intelligence (AI) and/or machine learning features.

Reporting/User Interface 158 may represent a Near Real-Time Dashboard, a Historical Dashboard as well as other outputs and interfaces. For example, Reporting/User Interface 158 may support Excel, PowerBI, SSRS Reports using SSAS. Reporting/User Interface 158 may represent an interactive dashboard that provides a graphical interface (e.g., line chart, etc.) that illustrates how an application is performing over a time period. The user interface may also provide historical information (e.g., average, percentile, etc.). The user interface may also include various bands, e.g., low band range, high band range, that illustrates accepted values, thresholds, etc. The user interface may also include an alert function that automatically sends a communication with details concerning the issue. The communication may include an electronic message sent to particular recipients, teams, etc. The alert may be informative. Also, the alert may require an action, response, and/or confirmation from the recipient. FIGS. 3-7, described in further detail below, provide exemplary illustrations.

Reporting/User Interface 158 provides users, such as development teams and operations teams, insight into operational characteristics of an application. Moreover, a development team, who is familiar with the application, may have the ability to instrument key components of the application and then view metrics about their application. In addition, a user interface, such as a dashboard, may be customized based on the type of user, e.g., development team, operations team, executive team, etc. For example, development teams may be interested in an operation of an application in the performance environment or even production environment. A development team may perform comparisons between an identified metric, e.g., a rate of request or a call that is taking longer than it should, and a normal (or baseline) measurement. The normal measurement may be predefined or defined based on a real-time determination, such as an average rate or duration for the last 14 days. Development teams may also compare a new or modified feature to a baseline activity of the application. According to another example, an operations team may view data at a higher level where data is examined on a holistic level, with alerts and other notifications. For example, operations team may monitor an application to verify that certain metrics are within acceptable ranges. An executive level may view an even higher level where a summary of application performance may be used for business decisions.

The Application Monitoring Tool may time, ascertain and/or measure certain events, such as a count of how many times an action is happening, a current value of a metric, etc. Metrics and events may vary based on the type of application as well as associated and available features, functions, etc. For an exemplary payment application, the Application Monitoring Tool may capture the rate of users making payments, posting about payment, etc. Other metrics may include the rate of a user performing a specific behavior on an application, etc. In addition, the Application Monitoring Tool may measure how long it takes to call a particular web service. For an application with many users, the Tool may then aggregate the data and measure an average time that it takes to call the particular web service. Other types of events may include a method call, web service call, a call to a database or other storage, for example.

An embodiment of the present invention is directed to integrating metrics and events. For example, tracing events may be fairly integrated with metrics collection. As the Application Monitoring Tool measures an application (e.g., timer metric) and notices measurements approaching a threshold, the Tool may automatically initiate a related event collection for that timer metric and capture trace events relevant to the timings to collect additional information about the related web service calls. When this information is logged, the system may provide the information via a dashboard or other user interface. The dashboard may provide aggregated metric timer data as well as individual calls and even rollups, sums as well as error counts and different types of errors for a particular call.

According to an embodiment of the present invention, exemplary target uses cases may include real-time production performance monitoring; historical production performance monitoring; feature usage and/or other telemetry; support root cause analysis and capacity planning. Target audiences may include development teams, operation teams and business teams. Target applications may include web applications, service layer/middle-tier, front-end, JavaScript, UI, Thick Client/Desktop applications, database/batch processing. An embodiment of the present invention is directed to measuring and capturing interactions and/or calls to a backend, server side (as opposed to user side interactions).

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Users may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Entity/Provider 132.

Application Monitoring Tool 130 may be communicatively coupled to various storage components, which may include databases, for example. Databases may include any suitable data structure to maintain the information and allow access and retrieval of the information. For example, Databases may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases may be any suitable storage device or devices. The storage may be local, remote, or a combination thereof with respect to Databases. Databases may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases may have back-up capability built-in. Communications with Databases may be over a network, such as network 102, or communications may involve a direct connection between Databases and Entity/Provider 132, as depicted in FIG. 1. Databases may also represent cloud or other network based storage.

According to an embodiment of the present invention, metrics may represent key statistics about a system or application that exhibit various characteristics. For example, metrics may measure a characteristic; capture overall application or operational state/health; provide numerical data (e.g., instantaneous values, rates, counts and timespans, etc.); and provide statistical analysis applied to values (e.g., moving averages, standard deviation, averages, percentiles, histograms, etc.). The metrics may be visualized or otherwise reported as aggregated and/or statistically significant values instead of raw single user/transaction/request values. Additional examples may include the timing of a method calls, request rate, internal application state such as queue count as well as longer term averages and application health checks.

According to an exemplary illustration, metrics may be conceptually grouped into two categories: (1) Operational Metrics and (2) Implementation Metrics. Operational metrics may include business-level concepts. Operation metrics may also be called Business, Service or Telemetry metrics. Operation metrics may include higher level metrics, perhaps more "business process" in nature. Operation metrics may also be tied to a business or operational service level agreement (SLA). Examples of operational metrics may include: count of payment Transaction X, Transaction X duration, Transaction X/sec. and may be used for comparing things such as release v1 to release v2 of applications as well as explain conditions, e.g., transaction X duration increased 25%, the count of transaction X increased by 50%, etc. Implementation Metrics may include: Technology-level concepts; Lower level method or RPC level metrics. Implementation metrics may be more closely tied to the underlying technology and internal implementation details instead of business level concepts. Implementation metrics may be used to aid in deeper analysis for a specific issue with a key Operational Metric above. Examples of implementation metrics may include SQL Server stored procedure call duration, WCF call duration and count, RESTful HTTP operation duration.

According to an embodiment of the present invention, a Correlation Identifier ("ID") may be used to capture the necessary data to enable tracing an individual transaction through the various system processes, flows, tiers, etc. This capability may be typically treated separately from the "metrics" and conventionally achieved using the concept of events. According to an embodiment of the present invention, events may represent logs that capture metadata plus a timestamp. To support correlation, the event metadata may contain parent/child relationships, Correlation ID or Activity ID concepts, etc.

According to an embodiment of the present invention, metrics and events may be related but mutually exclusive. While metrics may be used for measuring something, events may be used for deeper level investigation. For metrics, a single value is meaningful because it measures something. For events, at least two metrics are needed, e.g., the causer and the caused. An indeterminate amount of time may pass between the two events. Accordingly, the data collection and aggregation strategies may be substantially different.

For metrics, a sample may be collected and still be able to extract meaningful data. For events, a larger sample may be needed before anything valuable can be determined. To further illustrate the difference, concrete examples of metrics versus events implementations may include the following: Metrics may include Perfmon counters, Unix load averages while Events may include Windows Event Logs, SharePoint ULS, Event Tracing for Windows (ETW).

Metrics and Events data may be used together or separately. From an "APM Product" perspective, Metrics and Events should be treated separately because of considerations involving the following: different APIs; different collection techniques; different statistical and aggregation techniques; and different tooling for visualization/reporting/investigation.

Figure 2:
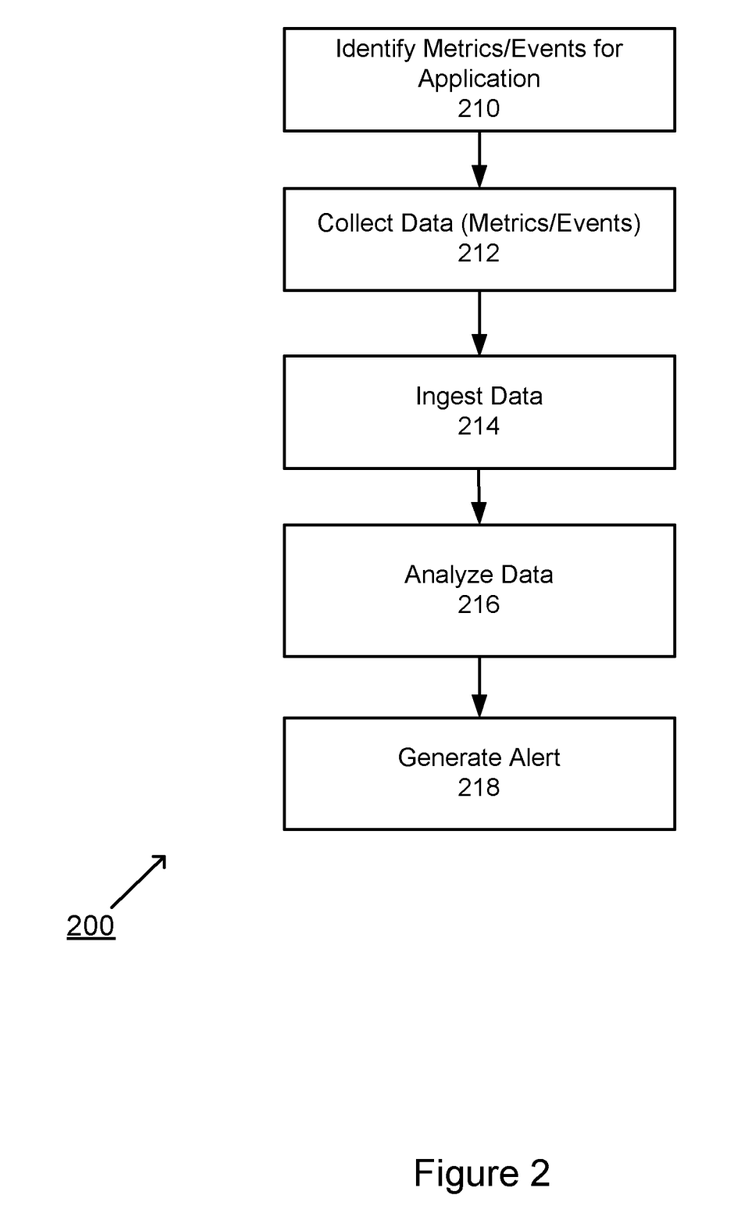
FIG. 2 is an exemplary flow diagram that executes an Application Monitoring Tool, according to an embodiment of the present invention.

FIG. 2 is an exemplary flow diagram that executes an Application Monitoring Tool, according to an embodiment of the present invention. At step 210, metric and/or events for an application may be identified. At step 212, data metrics and/or events may be collected. At step 214, the data may be ingested by the Application Monitoring Tool. At step 216, the data may be analyzed. At step 218, one or more alerts may be created and transmitted. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, metric and/or events for an application may be identified. The Application Monitoring Tool of an embodiment of the present invention empowers developers to collect telemetry metrics by instrumenting known locations of importance. By enabling a developer to select the metrics to collect, the measurements produced would be immediately relevant to operation of the application. And, the developers and operations team are directly invested in maintaining them. With the Application Monitoring Tool, metric instrumentation may be injected into the source code of the target application to collect metrics and events.

Application Monitoring Tool may also be implemented in various environments, including quality assurance (QA), performance (Perf), and production (Prod) environments to facilitate finding issues earlier in a development cycle where it is less expensive in time and money to fix. This also means developers may compare previous executions to current in QA and Perf environments to gauge the effects of their changes before Prod. For example, the Application Monitoring Tool may operate within a firm's standards; while still being able to evolve during cloud and DevOps transitions. With an embodiment of the present invention, an entity may target a physical infrastructure on common platforms first and then see that cloud targeting approaches could be supported with the same level of end user simplicity. An embodiment of the present invention may further avoid the long and time consuming onboarding processes required by current systems.

At step 212, data metrics and/or events may be collected. With the collection of metrics, an embodiment of the present invention offers a library for various target languages (e.g., .NET, Java and others to follow). By requiring minimal configuration information (e.g., an application identifier and Environment), the library may deliver the metrics to an ingestion service for processing. The library has a small impact on an instrumented application by limiting it to batching and posting data. With a process of taking a library dependency (instead of installing an agent), the production of metrics may occur wherever the application is executed. This removes a barrier to adoption and further simplifies the usage in various elastic cloud scenarios.

The Application Monitoring Tool ("Tool") may record various types of metrics, such as a Gauge, Counter and Timer. Other metrics may be recorded. A Gauge may represent a metric that records a single numerical value that can arbitrarily go up or down. A Gauge may be used to track an instantaneous value and/or amount of something. A Gauge is generally used to track a global state of an application or system by sampling the value on some frequency or when something happens and/or changes. Examples may include: current number of items in a queue; current count of files on disk that are pending processing; current size of an in-memory cache; and current battery temperature. For example, a Gauge API may record one row of data every time a "Set" method is called. The row of data may include: Timestamp; Metric Name; Unit; and Value. Based on the recorded data, the Tool may compute statistics, such as minimum, maximum and average values over some time period. A visual gauge or card showing the current value (e.g., the last reported value) may be displayed to the user via an interactive user interface or other output. In addition, a line chart showing the recorded value over time may also be used. Other graphics and outputs may be provided.

A Counter may represent a cumulative metric that tracks a single numerical value that goes up. A Counter may be used to track an occurrence of something happening. A Counter may be used to track "how much" of something. Counters are generally used to track cumulative counts, such as requests served, tasks completed or errors occurred. In addition, Counters may be used in a parallel processing/multi-threaded environment where a single named counter instance may be "incremented" concurrently. Examples of counters may include: count of requests; count of errors and count of batches or bytes uploaded. For example, a Counter API may record one row of data every time an "Increment" method. The data may include: Timestamp; Metric Name; Unit and Count. The Tool may pass in a count/amount value to the "Increment" method to capture a scenario where the Counter is used to track "how much" of something (e.g., throughput). Based on the recorded data, the Tool may compute statistics, such as minimum, maximum and average counts over some time period. The Tool may also compute rate/throughput with Total Count for Time Period/Time Period. For example, the Tool may display a line chart showing the count or rate over time via a user interface.

A Timer may represent a metric that tracks how long something takes (e.g., duration). A Timer may be used to track the occurrence of an operation, measure its execution time and success versus failure. Generally, a Timer may track the timing of web service calls, method calls or an execution of a specific block of code. For example, a Timer may also act like a Counter because each recorded record is essentially a record of the operation occurring once. A Timer API may record one row of data every time something is timed. The data may include: Timestamp; Metric Name; Unit; Duration; Success/Failure and Statistics. The Tool may compute statistics, such as minimum, maximum and average counts over some time period. The Tool may also compute statistics using the recorded duration values like minimum, maximum, average variance, standard deviation and percentiles. The output may be displayed on an interactive user interface as a line chart showing 1st, 50th, 90th, 95th, 99th, 99.5th and 99.9th percentiles, for example, over time. Other output variations may include a histogram showing the current distribution of the last x minutes.

Trace events may trace a single "transaction" or "activity" through a system. The system may be a distributed or non-distributed system. Trace events may provide high-level trace information about a chain of "calls" as the system processes a request. A "call" may be a web service call, a method call, a database call, an en queue call, etc. Metrics may indicate there is a problem in a certain area, while trace events may enable the next level of investigation of the problem. More specifically, a Timer may be used to record how long a "call" is taking. The metric data may be aggregated to provide statistics about the timings for a 5 minute window, the raw per-call metric data is not retained. On the other hand, trace events may be recorded and retained per-call. Each trace event may capture an "Activity ID" to identify the "activity." Using this, the Tool may trace an individual "activity" through the flow of an entire system (e.g., look for all events with a given Activity ID). Also, additional information, such as URL and return code, may be captured for each call. Using this, a user may troubleshoot and locate which call in the system flow is having problem, and view the return codes for that call. The Tool may further aggregate return codes as well, thereby providing a count of specific return code values over a certain time period. Trace events may be applied as a natural extension to a Metric Timer. Accordingly, if the Tool uses a Metric Timer to record how long a "call" is taking, the Tool may further record a trace event. To trace individual transactions/activities through the system, the application may provide a unique identifier (e.g., Activity ID) for that transaction/activity. The application may also be responsible for propagating the identifier through the various calls. That may involve passing the identifier as an argument if it is a method call, or passing the identifier as a query string parameter if making HTTP calls. The Tool may provide an API that accepts the Activity ID to be passed to it. An optional place to put the uniform resource locator that describes the call may include the URL of an HTTP call and name/identifier of other types of calls as well. In addition, the "calls" may return code as well as the method return code, an HTTP Status Code, etc.

At step 214, the data may be ingested by the Application Monitoring Tool. The data may be ingested based on predetermined time period buckets as well as other considerations based on the application performance and function. According to an embodiment of the present invention, the Application Monitoring Tool may roll data up to 5 minute buckets per metric, per machine. This makes the data being stored manageable while also having aggregates for a period immediately available. Other time periods may be implemented. For example, the Tool may use 1 minute rollups for finer grain visibility. Some applications run hotter during standard business hours, some run relatively consistent all day, while others run a few times a day in a batch fashion. An embodiment of the present invention may implement an ingestion layer to appropriately handle the inconsistent load presented by these and other scenarios in cases where onboarding occurs without prior notice from end users.

For example, when a batch is received, it may be stored in 1-n destinations. The destinations may be selected by an application identifier of the batch. The list of destinations may be located in a database or library and cached on each web server for faster access.

At step 216, the data may be analyzed. An embodiment of the present invention may analyze the metrics for anomalies and/or other conditions. For example, by observing how a metric normally acts, the Tool may recognize anomalies in the rollups. The Tool may flag a rollup as anomalous which may be displayed differently in the UI, identified as counts on reports as well as via an alert. An embodiment of the present invention may execute data science scripts to analyze the rollups to identify the anomalies. These scripts may be evolved without user input to better recognize anomalies. In addition, users may also flag anomalies on an interactive interface, such as dashboard.

At step 218, one or more alerts may be created and transmitted. The automatic analysis of metric rollups enables the ability to alert when criteria is met. The criteria may include a predetermined number (e.g., three) consecutive anomalous rollups in a row for a metric. The criteria may also be user configurable.

Figure 3:
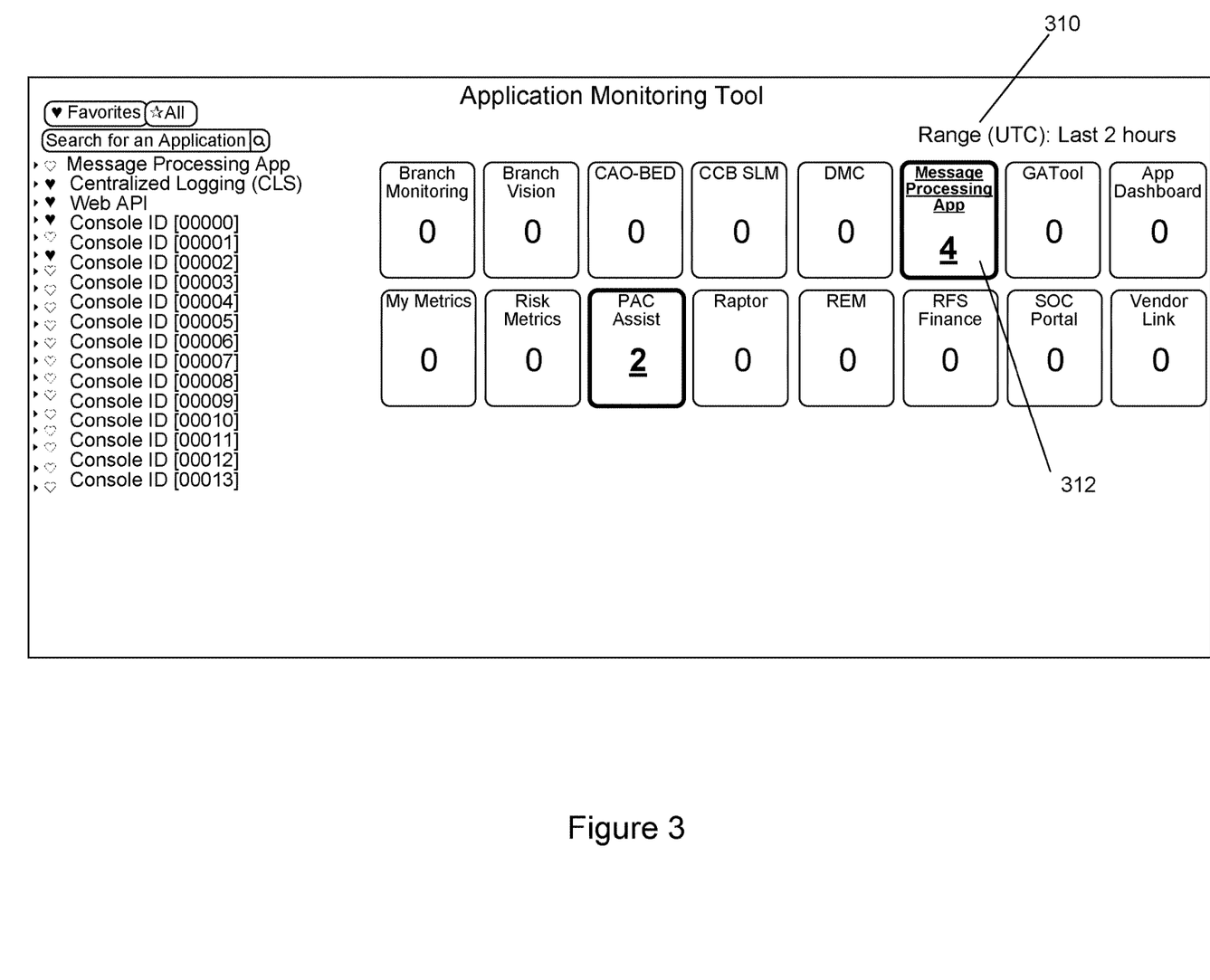
FIG. 3 is an exemplary illustration of a user interface, according to an embodiment of the present invention.

FIG. 3 is an exemplary illustration of a user interface, according to an embodiment of the present invention. As shown in FIG. 3, an Application Monitoring Tool may be provided. FIG. 3 illustrates various applications that are monitored with active alerts. In the example of FIG. 3, a Message Processing Application is selected at 312, which indicates that there are four alerts. The relevant time frame is shown as the last 2 hours, at 310.

Figure 4:
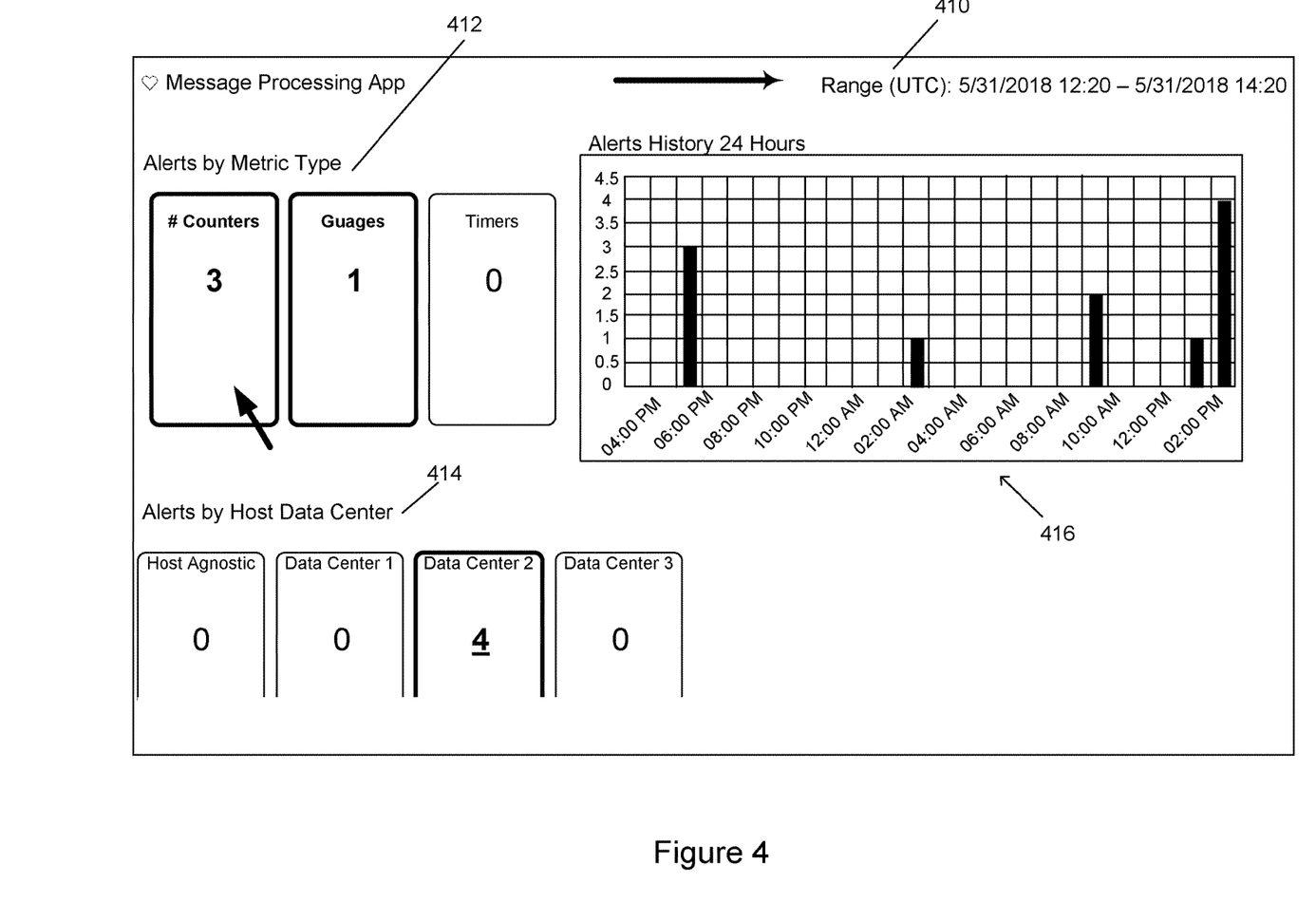
FIG. 4 is an exemplary illustration of a user interface, according to an embodiment of the present invention.

FIG. 4 is an exemplary illustration of a user interface, according to an embodiment of the present invention. A date range may be provided at 410 The example of FIG. 4 illustrates a Performance Environment. As shown in FIG. 4, a current state of alerts may be provided at 412 by metric type. Historical details may be shown at 416. In this illustration, alert history for the last 24 hours is provided. Other interactive graphics or displays may be used. Graph 416 is merely one exemplary illustration. In addition, FIG. 4 enables the user to correlate alerts by data center based on a sending machine, as shown by 414. In this example, four alerts are associated with Data Center 2. Additional details may be viewed by interacting with the "Counters" tile which has three alerts and the "Gauges" tile which has one alert.

Figure 5:
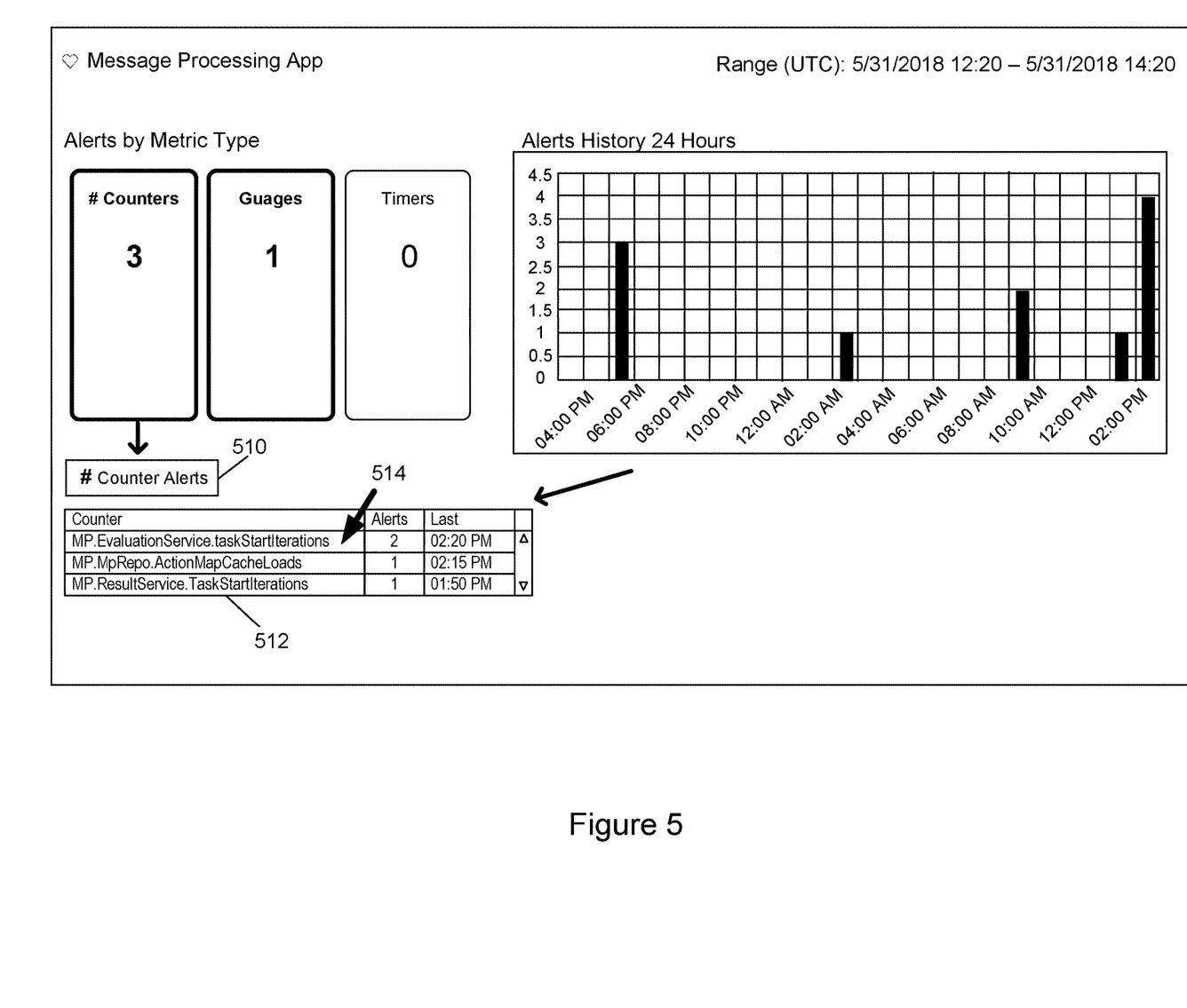
FIG. 5 is an exemplary illustration of a user interface, according to an embodiment of the present invention.

FIG. 5 is an exemplary illustration of a user interface, according to an embodiment of the present invention. Counter alert details may be displayed at 510. As shown in FIG. 5, counter details may include counter identifier, number of alerts and times, at 512. In this example, a user may select the first counter "MP.EvaluationService.TaskStartIterations" at 514.

According to an exemplary embodiment, metric names may be represented as a dotted name such as "MyApplicationName.MyComponent.PendingItems." This represents a namespace that goes from less to more specific. This approach allows context to be encoded directly into the metric name. For example, "MP.EvaulationService" represents an "EvaulationService" component that is part of a "Message Processing" Application. According to another example, a counter metric may be represented as "MP.EvaluationService.TaskStartIterations", which counts the number of "TaskStartIterations," which is an action the Evaluation Service runs.

Figure 6:
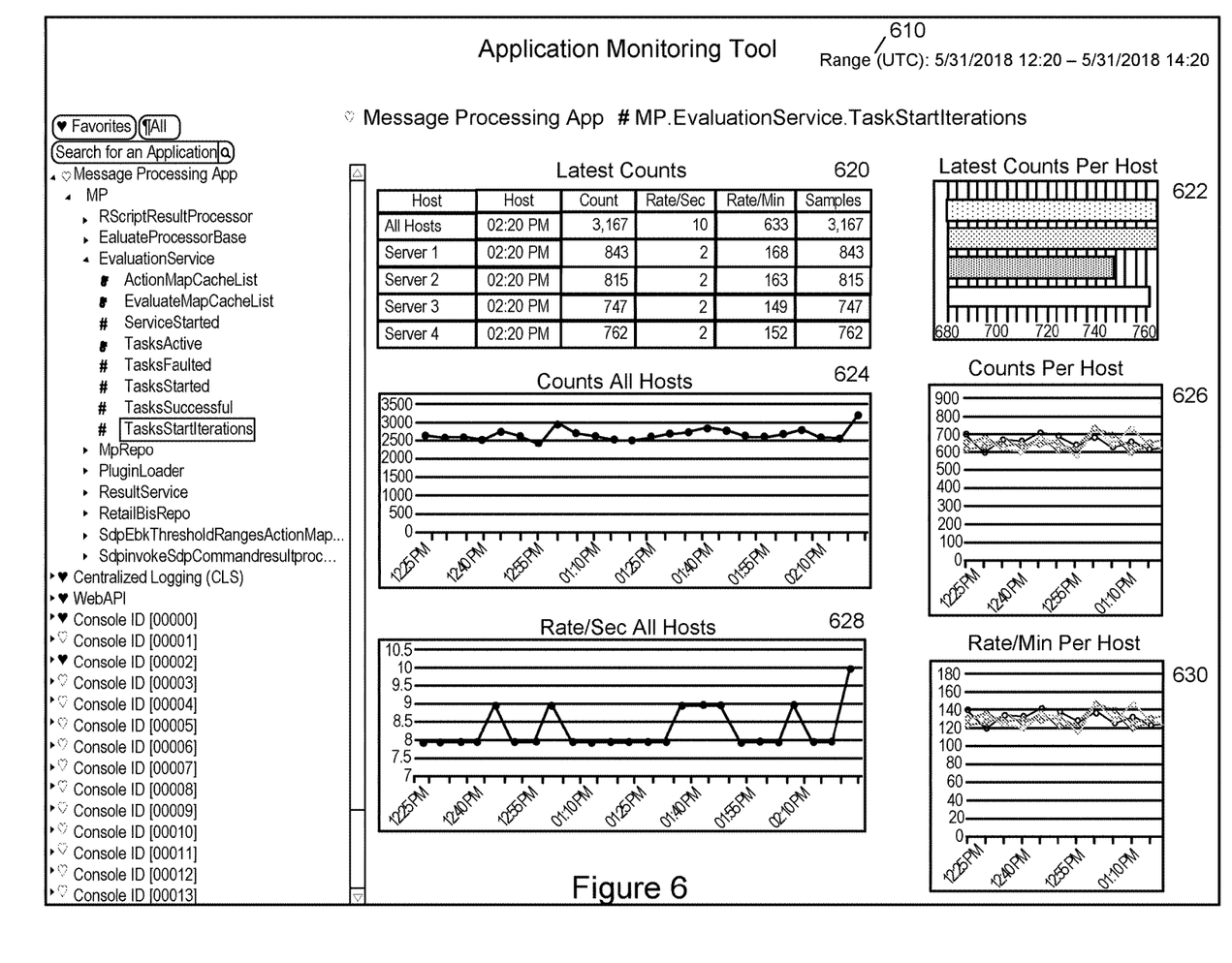
FIG. 6 is an exemplary illustration of a user interface, according to an embodiment of the present invention.

FIG. 6 is an exemplary illustration of a user interface, according to an embodiment of the present invention. As shown in FIG. 6, a menu of metrics may be displayed. For Evaluation Service, the user may select from a list of tasks. A user may browse and drill down to different components of an application. By selecting a counter, the system may now provide detailed count data for a predetermined time period, as shown at 610. FIG. 6 illustrates Latest Counts 620, Latest Counts per Host 622, Counts All Hosts 624, Counts Per Hots 626, Rate/Sec all Hosts 628 and Rate/Min per Host 630. Other measurements may be captured and displayed.

Figure 7:
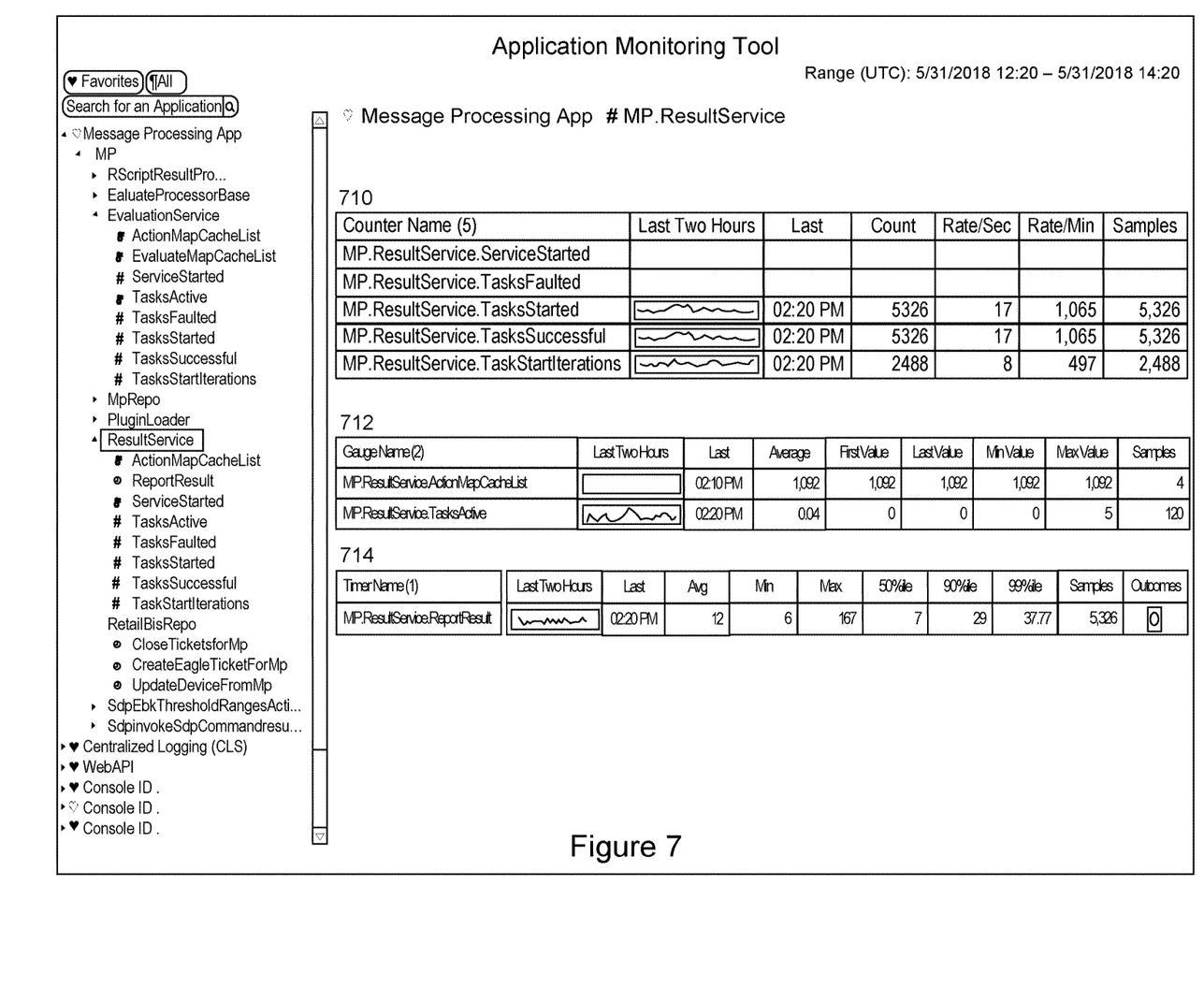
FIG. 7 is an exemplary illustration of a user interface, according to an embodiment of the present invention.

FIG. 7 is an exemplary illustration of a user interface, according to an embodiment of the present invention. The left side of the page shows various counters, timers and gauges (CTGs) based on a naming hierarchy, such as a multipart name hierarchy. A user may browse metrics under "Message Processing Application" to see the way CTGs are displayed. When an intermediate level, such as "MP.ResultService" is selected, a list of all CTGs may be displayed with recent data. FIG. 7 illustrates Counter details at 710, Gauge details at 712 and Timer details at 714.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, ADA, APL, BASIC, C, C++, COBOL, dBase, FORTH, FORTRAN, JAVA, MODULA-2, PASCAL, PROLOG, REXX, VISUAL BASIC, JavaScript and/or PYTHON. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A method for instrumenting a source code of a target application with internal metric collection for performance monitoring, the method comprising:
    identifying, during a development of a target application, one or more source code components of the target application for metric instrumentation;
    configuring, each of the one or more source code components of the target application, to generate one or more metric data values for each of one or more metrics associated with an operation of each of the one or more source code components, wherein the configuring of the one or more source code components is performed, using a metrics library, during the development of the target application, the metrics library being instrumented to the target application as a back-end process;
    recording, using one or more metric Application Programming Interfaces (APIs), a plurality of metric data values associated with an operation of each of the one or more source code components and generated during an execution of the target application;
    collecting, batching and transmitting, by the metrics library, the plurality of metric data values recorded by the one or more metric APIs to a back-end aggregation engine for processing, wherein the processing comprises computing, based on the plurality of metrics data values, a plurality of real-time and historical statistics for the one or more metrics associated with the operation of each of the one or more source code components of the target application and generating an interactive display of the plurality of real-time and historical statistics;
    determining, by the back-end aggregation engine, a normal measurement for at least one of the one or more metrics, wherein the normal measurement is determined based on a period of time defined by a user;
    generating one or more alerts upon identifying one or more anomalies in the plurality of metric data values corresponding to one or more deviations from the normal measurement; and
    displaying, the plurality of real-time and historical statistics and the one or more alerts via an interactive user interface, wherein the plurality of real-time and historical statistics are displayed according to one or more graphical formats comprising a line chart showing the recorded metric data values over time.

2. The method of claim 1, wherein at least one of the one or more metrics relate to a gauge that records a single numerical value that goes up or down.

3. The method of claim 1, wherein at least one of the one or more metrics relate to a counter that records a cumulative metric that tracks a single numerical value that goes up.

4. The method of claim 1, wherein at least one of the one or more metrics relate to a timer that tracks a duration.

5. The method of claim 1, wherein the plurality of real-time and historical statistics comprise percentiles, counts, sums and averages.

6. The method of claim 1, wherein the target application executes in one or more of the following environments: quality assurance, performance and production.

7. The method of claim 1, wherein the plurality of real-time and historical statistics are further compiled into a predetermined number of minutes bucket per metric, per source code component of the target application.

8. The method of claim 1, wherein the plurality of real-time and historical statistics are further analyzed for metric anomalies.

9. The method of claim 1, further comprising, configuring the one or more source code components of the target application to generate one or more event logs associated with an operation of each of the one or more source code components of the target application, wherein the one or more event logs are recorded by one or more event APIs.

10. The method of claim 9, wherein the event logs relate to a trace event that traces a single transaction through a chain of calls.

11. The method of claim 9, wherein the recording of the one or more event logs is initiated based on the one or more metric data values recorded by a corresponding metric API.

12. The method of claim 1, wherein the normal measurements for at least one of the one or more metrics correspond to values that are predetermined by the user.

13. The method of claim 1, wherein an amount of the one or more deviations from the normal measurements is provided by the user.

14. The method of claim 1, wherein the plurality of metrics data values are stored by a backend process for the purpose of one or more of data warehousing and non-real-time reporting.

* * * * *